United States Patent

Ossian et al.

[11] Patent Number: 6,039,890

[45] Date of Patent: Mar. 21, 2000

[54] QUICK ACTING ICE MELTER COMPOSITION

[75] Inventors: Kenneth C. Ossian, Bettendorf; Norbert J. Steinhauser, Dubuque, both of Iowa

[73] Assignee: Ossian, Inc., Davenport, Iowa

[21] Appl. No.: 09/334,095

[22] Filed: Jun. 16, 1999

[51] Int. Cl.$^7$ .................................................... C09K 3/18
[52] U.S. Cl. ................... 252/70; 106/13; 428/403
[58] Field of Search ................... 252/70; 106/13; 428/403

[56] References Cited

U.S. PATENT DOCUMENTS

| | | | |
|---|---|---|---|
| 3,245,912 | 4/1966 | White | 252/70 |
| 4,585,571 | 4/1986 | Bloom | 252/70 |
| 5,043,088 | 8/1991 | Falla | 252/70 |
| 5,211,869 | 5/1993 | Steinhauser et al. | 252/70 |
| 5,435,930 | 7/1995 | Chan et al. | 508/145 |
| 5,599,475 | 2/1997 | Ossian et al. | 252/70 |
| 5,651,915 | 7/1997 | Ossian et al. | 252/70 |
| 5,683,619 | 11/1997 | Ossian et al. | 252/70 |
| 5,817,252 | 10/1998 | Hu et al. | 252/70 |
| 5,935,488 | 8/1999 | Wiesenfeld et al. | 252/70 |

OTHER PUBLICATIONS

Chemical Abstract No. 81:123130, abstract of US Patent Application No. 412263 (Nov. 1973).
Derwent Abstract No. 1968–39765Q, abstract of Japanese Patent Specification No. 69–025688.(Jul. 1965).
Derwent Abstract No. 1986–012189, abstract of Soviet Union Patent Specification No. 760697 (Aug. 1985).
Japanese Patent Abstract No. JP410330737A, abstract of Japanese Patent Specification No. 10330737 (Dec. 1998).

*Primary Examiner*—Anthony Green
*Attorney, Agent, or Firm*—Zarley, McKee, Thomte, Voorhees & Sease

[57] ABSTRACT

A quick acting ice melting composition which contains an effective amount of an ice melter combination with an ice melter compatible surface active agent which enhances the melt speed of the ice melter.

8 Claims, No Drawings

QUICK ACTING ICE MELTER COMPOSITION

FIELD OF THE INVENTION

This invention relates to ice melters, and particularly quick acting ice melters.

BACKGROUND OF THE INVENTION

There are many products now used for melting ice and snow. These products can be, but are not limited to, hygroscopic salts such as calcium chloride and magnesium chloride; fertilizers such as potassium chloride and urea; and rock salt and non-slip aggregates like sand, cinders and calcined diatomaceous earth absorbents.

These current commercial products have their advantages and disadvantages. For example, the hygroscopic salts are excellent low-temperature melters, but are expensive and cause slippery conditions when overused. Fertilizers cause minimal problems on runoff, as they will aid surrounding vegetation, but as ice melters they have very poor characteristics. Rock salt is inexpensive, will kill vegetation on heavy runoff, and has poor ice melting properties. Aggregates, like sand, do not melt or solubilize, and therefore have difficulty embedding into ice to provide a non-slip surface.

To address some of these disadvantages, blends have been employed, but each ingredient acts independently with little to no synergistic effect. Agglomerates such as shown in our previous patent, U.S. Pat. No. 5,211,869, issued May 18, 1993, the disclosure of which is incorporated herein by reference, have been successful. They are, however, complex in their manufacture and are limited in their ability to synergistically coact with a wide range of base materials.

There are many products used for melting ice and snow. The predominant products are, but not solely limited to, calcium chloride, magnesium chloride, rock salt (sodium chloride), potassium chloride and urea, or mixtures of these various salts.

These ice melters are incapable of melting snow and ice in their solid form. They must form a liquid brine. This brine lowers the freezing point of water and effectively dissolves (melts) ice and snow on contact until it becomes diluted to a concentration where its freezing point is raised near water's.

The sooner the ice melting agent converts to a liquid brine, the sooner the ice melting action starts and the ice and snow hazard can be eliminated. Ice melting speed is clearly a critical safety issue with ice melting agents; therefore time to brine conversion is important.

The natural surface tension of the liquid ice melting brine slows the melting action. Surface tension is that force on the surface of a liquid which tends to diminish the surface area to a minimum. It results because of differences in inter molecular attraction (adhesion) at the surface and in the interior of the liquids; at the surface all of the molecules are attracted inward, while in the interior the attraction is the same in all directions. Surface tension has an important effect on the wetting and penetrating ability of the liquid ice melting brine and its resultant melting volume and melting speed of ice and snow.

To address some of the issues of ice melting-speed, in the past various blends have been employed. For example, it has been thought that the addition of calcium chloride and/or magnesium chloride in a dry blend will improve the melting performance of sodium chloride. This same concept is also employed by spraying on a liquid solution of calcium chloride and/or magnesium chloride onto sodium chloride prior to spreading. The goal of these various mixtures is to utilize the hygroscopic and superior melting characteristics of calcium chloride and/or magnesium chloride to improve those of sodium chloride, potassium chloride and urea. In this regard, see our earlier issued U.S. Pat. No. 5,599,475 of Feb. 4, 1997; U.S. Pat. No. 5,651,915 of Jul. 29, 1997, and U.S. Pat. No. 5,683,619 of Nov. 4, 1997, the disclosures of which are incorporated by reference. Also, agglomerates of these various mixtures have been employed with the purpose of improving ice melting performance, see our U.S. Pat. No. 5,599,475 of Feb. 4, 1997, which also is incorporated by reference. Because of a synergistic effect, these various combinations have met with some success. This success, however, can be improved even more, if the issue of surface tension is addressed.

In particular, speed of melting is a critical and important factor in determining the value of ice melting compositions. The reason for this should be apparent. Ice on surfaces represents a risk, and the quicker the risk is removed, the more effective the ice melter and the higher value it has to the consuming user. The trick, however, is to improve melt speed in an economical and practical and ecologically satisfactory way.

Accordingly, it is a primary objective of the present invention to improve now-used ice melter compositions by an additional additive which is an ice melter compatible surface active agent which significantly reduces the ice melting time when the ice melter is spread over a surface from which ice is to be removed.

Yet another objective of the present invention is to select amongst surface active agents those which are ice melter compatible in terms of their ability to reduce surface tension in the presence of high electrolyte concentrations, and at cold temperatures, i.e., from freezing (0° C. or 32° F.) down to −25° F.

A yet further objective of the present invention is to provide an ice melter composition process of preparation which is efficient, economical, and enhances the ability of the surface active agent to effectively lower ice melt time.

An even further objective of the present invention is to provide an ice melter composition which reduces the surface tension of ice melting brine, allowing it to more quickly penetrate into the ice and snow, thereby increasing its melting speed.

The method and means of accomplishing each of the above objectives as well as others will become apparent from the detailed description of the invention which follows hereinafter.

SUMMARY OF THE INVENTION

Ice melter compositions containing small but melt speed enhancing effective amounts of ice melter compatible surface active agents are the subject of the present invention. Ice melter compatible surface active agents are those which maintain their surface active properties in the presence of a high electrolyte concentration and at cold temperatures.

DETAILED DESCRIPTION OF THE PREFERRED EMBODIMENT

This ice melter composition can be divided into three classes of materials, i.e., ice melters, abrasives and absorbents. The first are commercially available solid ice melting products such as, but not limited to, urea, potassium chloride, and sodium chloride. The second are dry materials that do not melt, but are used for their abrasive or anti-slip properties such as but not limited to, sand, cinders and gravel. The third are calcined diatomaceous earth absorbents which also contribute to anti-slip, since they absorb moisture.

In the dry material mix, different components may be used, depending on the intended end market. For example, a street or parking lot would utilize sodium chloride coated with calcium chloride for economy. However, if runoff would end up in sensitive vegetation growth, one would want to substitute potassium chloride and/or urea for sodium chloride. On new concrete, one would need to control the liquid brine generated in the melting action. The use of abrasives on a steep hill would need assistance in embedding into the ice. The potential for the various dry material mix is unlimited to tailor the product to the specific end use. For present purposes, we have utilized various known products used for de-icing, traction and absorption for wintertime needs. It is not our intention to limit the list, but the following are illustrative:

|  | *% by weight range | ideal range |
|---|---|---|
| Ice melters |  |  |
| Sodium Chloride | 60% to 99% | 75% to 95% |
| Potassium Chloride | 60% to 99% | 75% to 95% |
| Urea | 50% to 99% | 60% to 95% |
| Abrasives |  |  |
| Sand | 60% to 99% | 70% to 95% |
| Gravel | 60% to 99% | 70% to 95% |
| Absorbents |  |  |
| Calcined Diatomaceous Earth | 50% to 99% | 60% to 90% |

As was earlier mentioned, the de-icer composition of the present invention is formed from a mixture by way of example of halide salts of alkali and alkaline earth metals. Preferably, the halide salts are chloride salts, and preferably the alkali and alkaline earth metals are sodium chloride, potassium chloride, magnesium chloride and calcium chloride.

In its broadest sense, the method comprises grinding the salts, mixing those to substantial homogeneity, spraying the mixed salts with an agglomerating fluid, and forming agglomerates, for example, on a pan agglomerator, followed by drying.

The nature of the precise de-icer composition for the present invention can vary as the process operator chooses for a particular job application. However, satisfactory results are achieved with compositions similar to those described in U.S. Pat. No. 2,988,509, issued Jun. 13, 1961, to Schilberg, the disclosure of which is incorporated by reference.

In the Schilberg patent, a process forming and mixing a plastic mass is used which is then extruded to obtain a uniform product that is dried and then ground. The process of Schilberg is not cost efficient because of high capital equipment and energy requirements.

The invention is described below with the reference to the constituents most commonly available in practice and usable for de-icer compositions, particularly sodium chloride, potassium chloride, calcium chloride, and magnesium chloride. It should, however, be recognized that for the purposes of the present invention, some of the sodium chloride portion can be replaced with potassium chloride. It is preferred that some portion of magnesium chloride be present in minor amounts, and as explained below, it is preferred that when used, the magnesium chloride be a solution and used as the agglomerating fluid. The advantages of the use of magnesium chloride in de-icer compositions are disclosed in U.S. Pat. No. 3,772,202, Neitzel, issued Nov. 13, 1973, the disclosure of which is here incorporated by reference.

As previously mentioned, the above patents and systems describe various improvements on ice melter compositions using various ice melters, processing conditions, abrasives and absorbents. However, none of this prior science evaluates the surface tension issues of the ice melters, and effectively reduces the surface tension of the ice melter brine to significantly improve the ice melting volume and the melting speed.

Ice melters attract moisture from the surrounding environment, and create a liquid brine. This brine lowers the freezing point of water, and effectively dissolves ice and snow on contact until it becomes so diluted to a concentration where its freezing point is raised nearly to that of water. At this point in time, its effectiveness is gone. As is well known, ice melters work because the ice melting composition or brine lowers the temperature at which water will freeze. In ice melter compositions that do not contain surface active agents at the interface of the ice melter brine and the packed snow or ice, the molecules are attracted inward in accordance with natural principles of adhesion. However, it has now been discovered that with the addition of surface active molecules as hereinafter described, the adhesion attraction of like molecules of a liquid substance is equalized, the surface tension reduced, and as a result the ice melting brine penetrates more quickly into the ice or packed snow, increasing significantly its melting speed.

The critical component in the ice melter invention here described is the surface active agent that reduces the surface tension in the melting brine produced by the various ice melting salts. This surface active agent must be able to reduce surface tension in high salt solution concentrations at temperatures below the freezing point of water. This is referred to as being ice melter compatible.

The complexity of measuring surface active agent's effects on surface tension when used with ice melting agents to increase melting volume and melting speed can be overwhelming at best. The surface tension will change with each salt, the concentration of that salt in the solution, and the temperature of the solution. In the melting process, the concentration of the salt is constantly changing because the melting process is one of constant dilution. Also, temperature could and often changes with each application. The colder the temperature, the greater the surface tension becomes. It becomes even more complex when combinations of various ice melting salts are used.

There are several agents that can be used to reduce surface tension. Some of the various possibilities include nonionic, anionic, cationic and amphoteric surfactants. For these surface active agents to be successful, they would exhibit superior wetting properties in a high salt solution of sodium chloride, calcium chloride, magnesium chloride, potassium chloride or urea, either individually or in combination.

The overall objective is to reduce the surface tension in a high salt brine solution. This will allow the dry salt to convert to a liquid melting brine faster to increase the melting volume and the melting speed of the ice melting salt.

After evaluating many broad range, nonionic, anionic, cationic and amphoteric surfactants, it has been found that those which are ice melter compatible, that is, maintain their surface activity at high electrolyte concentrations, and are effective at cold temperatures, are effective additives for ice melter compositions at weight concentrations of from 0.001% by weight of the total composition to 2.0% by weight of the total composition, preferably from 0.1% by weight of the composition to 1.0% by weight of the composition.

Those compositions which are effective can be described as including the group of anionic, nonionic, cationic and amphoteric surface active or wetting agents.

Suitable synthetic detergents are well known to those of ordinary skill in the art, but generally these surface active agents can be selected from the group consisting of anionic and nonionic surfactants.

Alkyl sulfate surfactants are a type of anionic surfactant of importance for use herein. Alkyl sulfates have the general formula $ROSO_3M$ wherein R preferably is a $C_{10}$–$C_{24}$ hydrocarbyl, preferably an alkyl or hydroxyalkyl having a $C_{10}$–$C_{20}$ alkyl component, more preferably a $C_{12}$–$C_{18}$ alkyl or hydroxyalkyl, and M is H or a cation, e.g., an alkali metal cation (e.g., sodium, potassium, lithium), substituted or unsubstituted ammonium cations such as methyl-, dimethyl-,and trimethyl-ammonium and quaternary ammonium cations, e.g., tetramethylammonium and dimethyl piperdinium, and cations derived from alkanolamines such as ethanolamine, diethanolamine, triethanolamine, and mixtures thereof, and the like. Typically, alkyl chains of $C_{12}$–$C_{16}$ are preferred for lower wash temperatures (e.g., below about 50° C.), and $C_{16}$–$C_{18}$ alkyl chains are preferred for higher wash temperatures (e.g., above about 50° C.).

Alkyl alkoxylated sulfate surfactants are another category of useful anionic surfactants. These surfactants are water soluble salts or acids typically of the formula $RO(A)_mSO_3M$, wherein R is an unsubstituted $C_{10}$–$C_{24}$ alkyl or hydroxyalkyl group having a $C_{10}$–$C_{24}$ alkyl component, preferably a $C_{12}$–$C_{20}$ alkyl or hydroxyalkyl, more preferably $C_{12}$–$C_{18}$ alkyl or hydroxyalkyl. A is an ethoxy or propoxy unit, m is greater than zero, typically between about 0.5 and about 6, more preferably between about 0.5 and about 3, and M is H or a cation which can be, for example, a metal cation (e.g., sodium, potassium, lithium, calcium, magnesium, etc.), ammonium or substituted-ammonium cation. Alkyl ethoxylated sulfates, as well as alkyl propoxylated sulfates, are contemplated herein. Specific examples of substituted ammonium cations include methyl-, dimethyl-, trimethyl-ammonium and quaternary ammonium cations, such as tetramethyl-ammonium, dimethyl piperydinium and cations derived from alkanolamines, e.g., monoethanolamine, diethanolamine, and triethanolamine, and mixtures thereof. Exemplary surfactants are $C_{12}$–$C_{18}$ alkyl polyethoxylate (1.0) sulfate, $C_{12}$–$C_{18}$ alkyl polyethoxylate (2.25) sulfate, $C_{12}$–$C_{18}$ alkyl polyethoxylate (3.0) sulfate, and $C_{12}$–$C_{18}$ alkyl polyethoxylate (4.0) sulfate wherein M is conveniently selected from sodium and potassium.

Other types of anionic surfactants can also be included in the compositions hereof. These can include salts (including, for example, sodium, potassium, ammonium, and substituted ammonium salts such as mono-, di- and triethanolamine salts) of soap, $C_9$–$C_{20}$ linear alkylbenzenesulphonates, $C_8$–$C_{22}$ primary or secondary alkanesulphonates, $C_8$–$C_{24}$ olefinsulphonates, sulphonated polycarboxylic acids, alkyl glycerol sulfonates, fatty acyl glycerol sulfonates, fatty oleyl glycerol sulfates, alkyl phenol ethylene oxide ether sulfates, paraffin sulfonates, alkyl phosphates, isothionates such as the acyl isothionates, N-acyl taurates, fatty acid amides of methyl tauride, alkyl succinamates and sulfosuccinates, monoesters of sulfosuccinate (especially saturated and unsaturated $C_{12}$–$C_{18}$ monoester) diesters of sulfosuccinate (especially saturated and unsaturated $C_6$–$C_{14}$ diesters), N-acyl sarcosinates, sulfates of alkylpolysaccharides such as the sulfates of alkylpolyglucoside, branched primary alkyl sulfates, alkyl polyethoxy carboxylates such as those of the formula $RO(CH_2CH_2O)_kCH_2COO$—M+ wherein R is a $C_8$–$C_{22}$ alkyl, k is an integer from 0 to 10, and M is a soluble salt-forming cation, and fatty acids esterified with isethionic acid and neutralized with sodium hydroxide. Further examples are given in *Surface Active Agents and Detergents* (Vol. I and II by Schwartz, Perry and Berch).

Suitable nonionic detergent surfactants are generally disclosed in U.S. Pat. No. 3,929,678, Laughlin et al., issued Dec. 30, 1975, at column 13, line 14, through column 16, line 6, incorporated herein by reference. Exemplary, non-limiting classes of useful nonionic surfactants are listed below.

The polyethylene, polypropylene, and polybutylene oxide condensates of alkyl phenols can be used. In general, the polyethylene oxide condensates are preferred. These compounds include the condensation products of alkyl phenols having an alkyl group containing from about 6 to about 12 carbon atoms in either a straight chain or branched chain configuration with the alkaline oxide. These compounds are commonly referred to as alkyl phenol alkoxylates, (e.g., alkyl phenol ethoxylates).

The condensation products of aliphatic alcohols with from about 1 to about 25 moles of ethylene oxide can also be used. The alkyl chain of the aliphatic alcohol can either be straight or branches, primary or secondary, and generally contains from about 8 to about 22 carbon atoms. Particularly preferred are the condensation products of alcohols having an alkyl group containing from about 10 to about 20 carbon atoms with from about 2 to about 18 moles of ethylene oxide per mole of alcohol.

Third, the condensation products of ethylene oxide with a hydrophobic base formed by the condensation of propylene oxide with propylene glycol can be used. Examples of compounds of this type include certain of the commercially available Pluronic™ surfactants, marketed by BASF.

Fourth, the condensation products of ethylene oxide with the product resulting from the reaction of propylene oxide and ethylenediamine may appropriately be used. Examples of this type of nonionic surfactant include certain of the commercially available Tetronic™ compounds, marketed by BASF.

Semi-polar nonionic surfactants are a special category of nonionic surfactants which include water-soluble amine oxides containing one alkyl moiety of from about 10 to about 18 carbon atoms, and 2 moieties selected from the group consisting of alkyl groups and hydroxyalkyl groups containing from about 1 to about 3 carbon atoms; water-soluble phosphine oxides containing one alkyl moiety of from about 10 to about 18 carbon atoms, and 2 moieties selected from the group consisting of alkyl groups and hydroxyalkyl groups containing from about 1 to about 3 carbon atoms; and water-soluble sulfoxides containing one alkyl moiety of from about 10 to about 18 carbon atoms, and a moiety selected from the group consisting of alkyl and hydroxyalkyl moieties of from about 1 to about 3 carbon atoms.

Semi-polar nonionic detergent surfactants include the amine oxide surfactants having the formula:

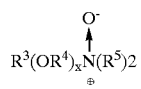

wherein $R^3$ is an alkyl, hydroxyalkyl, or alkyl phenyl group or mixtures thereof containing from about 8 to about 22 carbon atoms; $R^4$ is an alkylene or hydroxyalkylene group containing from about 2 to about 3 carbon atoms or mixtures thereof; x is from 0 to about 3; and each $R^5$ is an alkyl or hydroxyalkyl group containing from about 1 to about 3 carbon atoms or a polyethylene oxide group. The $R^5$ groups can be attached to each other, e.g., through an oxygen or nitrogen atom, to form a ring structure.

These amine oxide surfactants in particular include $C_{10}$–$C_{18}$ alkyl dimethyl amine oxides and $C_8$–$C_{12}$ alkoxy ethyl dihydroxy ethyl amine oxides.

Alkylpolysaccharides disclosed in U.S. Pat. No. 4,565,647, Llenado, issued Jan. 21, 1986, having a hydrophobic group containing from about 6 to about 30 carbon atoms, preferably from about 10 to about 16 carbon atoms and a polysaccharide, e.g., a polyglycoside, hydrophilic group containing from about 1.3 to about 10, preferably from about 1.3 to about 3, most preferably from about 1.3 to about 2.7 saccharide units, can be used. Any reducing saccharide containing 5 or 6 carbon atoms can be used, e.g., glucose, galactose and galactosyl moieties can be substituted for the glucosyl moieties (optionally, the hydrophobic group is attached at the 2-,3-,4-, etc. positions, thus giving a glucose or galactose as opposed to a glucoside or galactoside). The intersaccharide bonds can be, e.g., between the one position of the additional saccharide units and the 2-,3-,4-, and/or 6-positions on the preceding saccharide units.

Fatty acid amide surfactants having the formula:

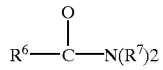

wherein $R^6$ is an alkyl group containing from about 7 to about 21 (preferably from about 9 to about 17) carbon atoms, and each $R^7$ is selected from the group consisting of hydrogen. $C_1$–$C_4$ alkyl, $C_1$–$C_4$ hydroxyalkyl, and —$(C_2H_4O)_xH$ where x varies from about 1 to about 3 can be used.

Nonionic ether linked surfactants are preferred such as Laureth®23 or Laureth®4.

In addition to the above-described and preferred anionic and nonionic surfactants, one may use cationic and amphoteric surfactants as well. Anionic surfactants can include cationic/quaternary surfactants/Trimethyl C8C10 quaternary ammonium chloride; cationic/quaternary surfactants/Trimethyl dodecyl ammonium chloride; cationic/quaternary surfactants/Dicoco dimethyl ammonium chloride; cationic/quaternary surfactants/N-alkyl trimethyl ammonium chloride; cationic/quaternary surfactants/Oleamidepropyl PG dimonium chloride; and cationic/quaternary surfactants/Methyl bis(2-hydroxyethyl cocoalkyl quaternary ammonium chloride. Amphoteric surfactants generally can include those that are silicone-based, such as amphoteric/silicone surfactants of polysyloxane, polyalkyl betaine copolymers, and amphoteric/lecithin and lecithin derivatives.

The following examples are offered to further illustrate but not limit the process of the present invention. In the examples it should be understood that various modifications of compositions can be made and still fall within the spirit and scope of the present invention, that is, a melt speed enhancing ice melter composition that contains an ice melter compatible surface active agent.

EXAMPLES

In the examples shown below and in the tables summarizing the data of those examples, specific concentrations of various surface active agents were coated onto ice melter compositions. The composition was placed on ice per SHRP-H-205.3 standards and measured against untreated compositions. The laboratory freezer was set for 20 minutes at 15° F. After the elapsed time, the melted brine was extracted from the ice samples and measured in milliliters. Each treated sample was repeated three times, and the results averaged and compared to untreated sample averages. In each occurrence, one untreated sample was included with each test to establish a standard for untreated samples. At the end of the test run, all untreated samples were added and averaged. All but one shows a 0.1% concentration of the listed surface active agents coated onto sodium chloride and calcium chloride dihydrate. The values are listed in Table 1 for the percent gain for sodium chloride treated with samples of a 0.1% surface active agent in comparison with untreated samples at the same 15° F.

TABLE 1

| Surface Active Agent (Type/Classification/Description) | |
|---|---|
| Nonionic/Ethoxylated Alkylohenols/Ethoxylated nonylphenol 8 moles of EO | 26.26% |
| Cationic/Quaternary surfactants/Trimethyl C8C10 quaternary ammonium chloride | 25.11% |
| Anionic/Carboxylic acids fatty acids/Modified carboxylate | 24.54% |
| Nonionic/Propoxylated & ethoxylated fatty acids, alcohols or alkyl phenols/Alkoxylated linear alcohol | 23.39% |
| Nonionic/Propoxylated & ethoxylated fatty acids, alcohols or alkyl phenols/Alkoxylated linear alcohol | 21.67% |
| Anionic/Sulfates and sulfonates of oils and fatty acids/Sodium salt of sulfonated oleic acid ester | 21.67% |
| Nonionic/Silicone based surfactants/Organo modified silicone | 20.52% |
| Nonionic/Ethoxylated fatty esters and oils(animal & veg.)/PEG-6 caprylic/capric glycerides | 20.52% |
| Nonionic/Silicone based surfactants/silicone glycol copolymer | 19.38% |
| Anionic/Sulfosuccinates and derivatives/Sodium diamyl sulfosuccinate | 19.38% |
| Amphoteric/Silicone based surfactants/Polysiloxane polyalkyl betaine copolymers | 18.80% |
| Nonionic/Fluorocarbon based surfactant/Fluorochemical surfactant | 18.23% |
| Amphoteric/Lecithin and lecithin derivatives/Lecithin and surfactants | 15.93% |
| Anionic/Sulfates and sulfonates of oils and fatty acids/Sodium salt of sulfonated oleic acid | 14.78% |
| Not Classified/Amine Salt/Unavailable | 14.78% |

TABLE 1-continued

| Surface Active Agent (Type/Classification/Description) | |
|---|---|
| Cationic/Quaternary surfactants/Oleamidopropyl PG dimonium chloride | 14.21% |
| Cationic/Quaternary surfactants/Ethoxylated cocoalkyl methyl quaternary ammonium chloride | 14.21% |
| Nonionic/Proprietary cleavable ethoxylate | 13.64% |
| Nonionic/Silicone based surfactants/Polysiloxane polyether copolymers | 13.06% |
| Nonionic/Glycerol ester/decaglycerol mono dioleate | 13.06% |
| Nonionic/Ethoxylated Alkylphenols/Ethoxylated nonylphenol 12 moles of EO | 11.91% |
| Nonionic/Ethoxylated Alkylphenols/Ethoxylated nonylphenol 3 moles of EO | 11.34% |
| Nonionic/Silicone based surfactants/silicone glycol copolymer | 10.19% |
| Anionic/Sulfosuccinates and derivatives/Dioctyl ester of sodium sulfosuccinic acid | 10.19% |
| Cationic/Quaternary surfactants/Trimethyl dodecyl ammonium chloride | 10.19% |
| Nonionic/Ethoxylated Alkylphenols/Ethoxylated nonylphenol 1 mole of EO | 9.62% |
| Not Classified/Phosphates/Unavailable | 9.62% |
| Cationic/Quaternary surfactants/Methyl bis(2-hydroxyethyl cocoalkyl quaternary ammonium chloride | 9.04% |
| Nonionic/Ethoxylated Alkylohenols/Ethoxylated nonylphenol 6 moles of EO | 8.47% |
| Anionic/Sulfosuccinates and derivatives/Dioctyl sodium sulfosuccinate | 8.47% |
| Nonionic/Ethoxylated Alkylphenols/Ethoxylated nonylphenol 30 moles of EO | 7.90% |
| Nonionic/Ethoxylated Alkylphenols/Ethoxylated nonylphenol 4 moles of EO | 7.32% |
| Nonionic/Ethoxylated Alkylphenols/Ethoxylated nonylphenol 9.5 moles of EO | 7.32% |
| Amphoteric/Amphoteric | |
| Anionic/Phosphate Esters/Free acid of a complex organic phosphate ester | 6.75% |
| Nonionic/Amine Oxides/Lauryl(12,14,16 blend)dimethyl amine oxide | 6.18% |
| Anionic/Diphenyl sulfonate derivatives/sodium n-decyl diphenyl oxide disulfonate | 5.60% |
| Nonionic/Ethoxylated Alkylohenols/Ethoxylated nonylphenol 10.5 moles of EO | 5.03% |
| Anionic/Sodium xylene sulfonate | 5.03% |

Table 2 below compares the values of performance in percent gain for calcium chloride treated samples with a 0.1% surface active agent to untreated samples at the same 15° F.

TABLE 2

| Surface Active Agent (Type/Classification/Description) | |
|---|---|
| Nonionic/Silicone based surfactants/silicone glycol copolymer | 31.46% |
| Anionic/Sulfosuccinates and derivatives/Sodium diamyl sulfosuccinate | 21.05% |
| Cationic/Quaternary surfactants/Trimethyl C8C10 quaternary ammonium chloride | 19.74% |
| Anionic/Sulfosuccinates and derivatives/Dioctyl sodium sulfosuccinate | 19.42% |
| Nonionic/Amine Oxides/Lauryl(12,14,16 blend)dimathyl amine oxide | 16.82% |
| Not Classified/Amine Salt/Unavailable | 16.49% |
| Nonionic/Glycerol esters/decaglycerol mono dioleate | 16.17% |
| Nonionic/Ethoxylated Alkylphenols/Ethoxylated nonylphenol 3 moles of EO | 15.84% |
| Nonionic/Ethoxylated Alkylohenols/Ethoxylated nonylphenol 8 moles of EO | 15.19% |
| Nonionic/Fluorocarbon based surfactant/Fluorochemical surfactant | 14.86% |
| Anionic/Sulfates and sulfonates of oils and fatty acids/Sodium salt of sulfonated oleic acid | 14.86% |
| Nonionic/Silicone based surfactants/silicone glycol copolymer | 13.56% |
| Nonionic/Ethoxylated Alkylohenols/Ethoxylated nonylphenol 9.5 moles of EO | 13.24% |
| Anionic/Sulfates and sulfonates of oils and fatty acids/Sodium salt of sulfonated oleic acid ester | 13.24% |
| Anionic/Polymeric(polysaccharides, acrylic acid, acrylamide)/Poly(methyl vinyl ether/maleic acid) | 12.91% |
| Nonionic/Ethoxylated Alkylphenols/Ethoxylated nonylphenol 30 moles of EO | 12.26% |
| Nonionic/Propoxylated & ethoxylated fatty acids, alcohols or alkyl phenols/Alkoxylated linear alcohol | 12.26% |
| Nonionic/Proprietary cleavable ethoxylate | 11.94% |
| Nonionic/Propoxylated & ethoxylated fatty acids, alcohols or alkyl phenols/Alkoxylated linear alcohol | 11.28% |
| Cationic/Quaternary surfactants/Trimethyl dodecyl ammonium chloride | 11.28% |
| Anionic/Sulfosuccinates and derivatives/Dioctyl ester of sodium sulfosuccinic acid | 10.63% |
| Anionic/Phosphate Esters/Free acid of a complex organic phosphate ester | 10.63% |
| Cationic/Quaternary surfactants/Dicoco dimethyl ammonium chloride | 10.63% |
| Cationic/Quaternary surfactants/N-alkyl trimethyl ammonium chloride | 10.63% |
| Amphoteric/Silicone based surfactants/Polysiloxane polyalkyl betaine copolymers | 9.66% |
| Nonionic/Ethoxylated fatty esters and oils(animal & veg.)/PEG-6 caprylic/capric glycerides | 9.33% |
| Cationic/Quaternary surfactants/Oleamidopropyl PG dimonium chloride | 9.33% |
| Nonionic/Ethoxylated Alkylphenols/Ethoxylated nonylphenol 1 mole of EO | 8.68% |
| Cationic/Quaternary surfactants/Methyl bis(2-hydroxyethyl cocoalkyl quaternary ammonium chloride | 8.68% |
| Nonionic/Ethoxylated Alkylohenols/Ethoxylated nonylphenol 10.5 moles of EO | 7.38% |
| Nonionic/Silicone based surfactants/Polysiloxane polyether copolymers | 7.38% |
| Nonionic/Silicone based surfactants/Organo modified silicone | 7.38% |
| Nonionic/Ethoxylated Alkylohenols/Ethoxylated nonylphenol 6 moles of EO | 6.73% |
| Anionic/Silicone based surfactants/Polysiloxane polyorgano thiosulfate | 6.73% |
| Amphoteric/Amphoteric | 6.40% |
| Nonionic/Ethoxylated Alkylphenols/Ethoxylated nonylphenol 12 moles of EO | 6.08% |

TABLE 2-continued

| Surface Active Agent (Type/Classification/Description) | |
|---|---|
| Nonionic/Ethoxylated fatty esters and oils (animal & veg.)/PEG-7 glyceryl cocoate | 6.08% |
| Nonionic/Ethoxylated Alkylphenols/Ethoxylated nonylphen 4 moles of EO | 5.43% |

Table 3 compares values in order of performance of percent gain for calcium chloride treated with samples of 0.1% surface active agent to untreated samples at 0° F.

TABLE 3

| Surface Active Agent (Type/Classification/Description) | |
|---|---|
| Nonionic/Silicone based surfactants/silicone glycol copolymer | 38.80% |
| Cationic/Quaternary surfactants/Trimethyl C8C10 quaternary ammonium chloride | 29.69% |
| Not Classified/Amine Salt/Unavailable | 28.08% |
| Nonionic/Amine Oxides/Lauryl(12,14,16 blend)dimethyl amine oxide | 27.01% |
| Anionic/Sulfosuccinates and derivatives/Sodium diamyl sulfosuccinate | 27.01% |
| Nonionic/Ethoxylated Alkylohenols/Ethoxylated nonylphenol 8 moles of EO | 25.40% |
| Nonionic/Ethoxylated Alkylohenols/Ethoxylated nonylphenol 9.5 moles of EO | 24.33% |
| Nonionic/Etholylated Alkylphenols/Ethoxylated nonylphenol 4 moles of EO | 22.72% |
| Nonionic/Ethoxylated Alkylphenols/Ethoxylated nonylphenol 12 moles of EO | 22.72% |
| Nonionic/Ethoxylated Alkylohenols/Ethoxylated nonylphenol 10.5 moles of EO | 22.19% |
| Nonionic/Ethoxylated Alkylohenols/Ethoxylated nonylphenol 6 moles of EO | 21.11% |
| Anionic/Sulfates and sulfonates of oils and fatty acids/Sodium salt of sulfonated oleic acid ester | 17.90% |
| Nonionic/Propoxylated & ethoxylated fatty acids, alcohols or alkyl phenols/Alkoxylated linear alcohol | 17.36% |
| Nonionic/Silicone based surfactants/silicone glycol copolymer | 17.36% |
| Nonionic/Glycerol esters/decaglycerol mono dioleate | 16.83% |
| Nonionic/Fluorocarbon based surfactant/Fluorochemical surfactant | 16.83% |
| Anionic/Sulfosuccinates and derivatives/Dioctyl sodium sulfosuccinate | 16.83% |
| Cationic/Quaternary surfactants/Dicoco dimethyl ammonium chloride | 16.83% |
| Nonionic/Ethoxylated Alkylphenols/Ethoxylated nonylphenol 30 moles of EO | 16.29% |
| Cationic/Quaternary surfactants/N-alkyl trimethyl ammonium chloride | 14.68% |
| Anionic/Sodium xylene sulfonate | 13.61% |
| Cationic/Quaternary surfactants/Oleamidopropyl PG dimonium chloride | 13.61% |
| Anionic/Sulfates and sulfonates of oils and fatty acids/Sodium salt of sulfonated oleic acid | 13.08% |
| Nonionic/Silicone based surfactants/Polysiloxane polyether copolymers | 12.54% |
| Nonionic/Ethoxylated fatty esters and oils(animal & veg.)/PEG-6 caprylic/capric glycerides | 12.54% |
| Nonionic/Silicone based surfactants/Organo modified silicone | 11.47% |
| Anionic/Sulfosuccinamates/Terasodium N(1,2-dicarboxethyl)-N-octadecyl sulfosuccinamate | 10.93% |
| Nonionic/Ethoxylated Alkylphenols/Ethoxylated nonylphenol 3 moles of EO | 10.40% |
| Anionic/Silicone based surfactants/Polysiloxane polyorgano thiosulfate | 10.40% |
| Nonionic/Ethoxylated Alkylphenols/Ethoxylated nonylphenol 1 mole of EO | 9.32% |
| Anionic/Sulfosuccinates and derivatives/Dioctyl ester of sodium sulfosuccinic acid | 9.32% |
| Anionic/Phosphate Esters/Free acid of a complex organic phosphate ester | 9.32% |
| Anionic/Polymeric(polysaccharides, acrylic acid, acrylamide)/Poly(methyl vinyl ether/maleic acid) | 7.18% |
| Nonionic/Ethoxylated fatty esters and oils(animal & veg.)/PEG-7 glyceryl cocoate | 6.11% |
| Anionic/Carboxylic acids fatty acids/Modified carboxylate | 5.57% |
| Amphoteric/Silicone based surfactants/Polysiloxane polyalkyl betaine copolymers | 5.04% |

As can be seen from Tables 1, 2 and 3, a small amount of surface active agent is all that is required to reduce the surface tension. In these instances, only 0.1% by weight of the composition was used. 10 of the best performers were selected from Tables 1, 2 and 3 and tested at 0.001%, 0.01%, 0.1% and 1% concentration. After doing such summary studies, it was concluded that increasing melting speed occurs over concentrations ranging from 0.01% up to 2%, but it is uneconomical to use more than about 1% by weight of the surface active agent. Some effect occurs even as low as 0.001% by weight of the ice melter composition. Generally speaking, the most favorable and preferred concentrations are at ranges between 0.1% and 1%.

Currently, over 95% of all commercial ice melting salts are composed of five basic raw materials. They are sodium chloride, calcium chloride, magnesium chloride, potassium chloride and urea. These raw materials can be used individually or in various combinations. Of these five raw materials, sodium chloride and calcium chloride are the most widely used. Therefore, the previous cited testing has been targeted toward these two popular ice melters.

To complete the testing on the other ice melting salts, magnesium chloride, potassium chloride, and urea, three of the better performing surface active agents, were selected from Table 2 for testing.

Chemical Type/Classification/Description and results shown in Table 4 are identified as follows:

1. Nonionic/Ethoxylated alkylphenols/Ethoxylated nonylphenol 8 moles of ethylene oxide;
2. Cationic/Quaternary surfactants/Trimethyl C8C10 quaternary ammonium chloride;
3. Anionic/Sulfates and sulfates of oils and fatty acids.

Table 4 compares melting values in milliliters of magnesium chloride, potassium chloride and urea treated samples with a 0.1% surface active agent to untreated samples. Magnesium chloride was tested at 15° F. for 20 minutes. Potassium chloride and urea are poor ice melters; therefore they were tested at 20° F. for 20 minutes. Tests were conducted per SHRP-H-205.3 standard with three replications. The results follow.

TABLE 4

| | Average Treated | Average Untreated | Gain | % Gain |
|---|---|---|---|---|
| Magnesium Chloride | | | | |
| Treated w/sample 1 | 10.97 | 9.93 | 1.04 | 10.47 |
| Treated w/sample 2 | 10.73 | 9.93 | .80 | 8.05 |
| Treated w/sample 3 | 10.40 | 9.93 | .47 | 4.73 |
| Potassium Chloride | | | | |
| Treated w/sample 1 | 3.57 | 2.17 | 1.40 | 64.52 |
| Treated w/sample 2 | 3.67 | 2.17 | 1.50 | 69.12 |
| Treated w/sample 3 | 3.63 | 2.17 | 1.46 | 67.28 |
| Urea | | | | |
| Treated w/sample 1 | 5.03 | 4.23 | .80 | 18.91 |
| Treated w/sample 2 | 4.97 | 4.23 | .74 | 17.49 |
| Treated w/sample 3 | 5.10 | 4.23 | .87 | 20.57 |

One can summarize the conclusions of Table 4 by indicating that surface active agents increase melting speed of magnesium chloride, potassium chloride and urea. In addition, the results dramatically demonstrate that as ice melters approach their lowest possible melting point (see potassium chloride from above in Table 4) the surface active agent can become even more beneficial, increasing the melting volume and the melting speed.

The previous examples focused on the individual ingredients, calcium chloride, magnesium chloride, sodium chloride, potassium chloride, urea and their melting performances. Many times these individual ingredients are combined for various synergistic effects. Three popular blend formulations currently used in the institutional and industrial markets are as follows:

1. 10% calcium chloride plus 90% sodium chloride;
2. 5% magnesium chloride plus 95% sodium chloride;
3. 50% sodium chloride plus 50% potassium chloride.

The concept in formulations #1 and #2 above is the more hygroscopic calcium chloride and magnesium chloride will pull moisture more rapidly than the sodium chloride. The calcium chloride and magnesium chloride portions will convert to a liquid melting brine faster than the sodium chloride. This brine in turn will come in contact with the sodium chloride and will speed its conversion to a liquid melting brine earlier than it would by itself. The #3 formulation above is similar, except in this case the slower melting sodium chloride brine aids the very poor melting performance of potassium chloride.

Our earlier examples have shown how a surface active agent improves the melting action of individual melting salts. The following Table 5 makes comparisons of three popular blends treated and untreated with a surface active agent.

In each sample the test has been replicated three times. The samples were placed on ice for 20 minutes. Formulations #1 and #2 were tested at 15 degrees, and formulation #3 was tested at 20 degrees because of the potassium chloride content. As before, tests were conducted per SHRP-H-205.3 standards.

TABLE 5

| Sample #1A | untreated blend 10% calcium chloride dihydrate and 90% sodium chloride; |
|---|---|
| Sample #1B | same blend as #1A, but both the calcium chloride and sodium chloride were coated with a .1% surface active agent. The surface active agent used was an ethoxylated nonylphenol 8 moles of ethylene oxide. |

Formulation #1

| | Sample #1A | Sample #1B |
|---|---|---|
| Test #1 | 7.4 | 7.8 |
| Test #2 | 7.3 | 8.0 |
| Test #3 | 7.1 | 8.1 |
| Average | 7.27 | 7.97 |
| Gain | | .70 |
| % Gain | | 9.6% |

| Sample #1C | untreated blend 5% magnesium chloride and 95% sodium chloride |
|---|---|
| Sample #1D | same blend as #1C, but both the magnesium chloride and sodium chloride were coated with a .1% surface active agent. The surface active agent used was an ethoxylated nonylphenol 8 moles of ethylene oxide. |

Formulation #2

| | Sample #1C | Sample #1D |
|---|---|---|
| Test #1 | 6.8 | 7.2 |
| Test #2 | 6.9 | 7.6 |
| Test #3 | 6.6 | 7.5 |
| Average | 6.77 | 7.43 |
| Gain | | .63 |
| % Gain | | 9.8% |

| Sample #1E | untreated blend 50% sodium chloride and 50% potassium chloride |
|---|---|
| Sample #1F | same blend as #1E, but both the sodium chloride and potassium chloride were coated with a .1% surface active agent. The surface active agent used was an ethoxylated nonylphenol 8 moles of ethylene oxide. |

Formulation #3

| | Sample #1E | Sample #1F |
|---|---|---|
| Test #1 | 7.5 | 8.5 |
| Test #2 | 7.2 | 8.2 |
| Test #3 | 7.2 | 8.6 |
| Average | 7.3 | 8.43 |
| % Gain | | 1.13 |
| % Gain | | 16% |

In conclusion, Table 5 demonstrates that the addition of a surface active agent enhances the melting performance of blends. Even in cases where these blends have been formulated specifically to speed the melting action, the addition of a surface active agent only enhances the formulation more.

In the above examples, the surface active agent was coated on dry ice melter compositions. Such coating can typically occur in commercial practice in a mechanical mixer involving spraying of the surface active agent on tumbling or agitated ice melter composition, followed by mixing into homogeneous and then discharge and packaging. However, in addition to such compositions, dry ice melting salt liquids are often used as aids to convert dry salts to a liquid ice melting brine. Surface active agents of the present invention can also be used in this environment. Thus for example, where our ice melter compositions are prewet with a liquid brine solution such as the prewetting of sodium chloride with a solution of calcium chloride and/or magnesium chloride, benefits are also achieved if surface active agents are added to the liquid brine solution prior to the prewetting.

To test the benefits of a surface active agent in combination with a liquid ice melter such as liquid calcium chloride, and then the coating of that solution onto a dry ice melting salt such as sodium chloride, the following test was conducted in Table 6. The prewetting of sodium chloride with a liquid calcium chloride solution is utilized when temperatures drop below the effective melting temperature of sodium chloride. The addition of the liquid calcium chloride helps the sodium chloride convert to a liquid brine, allowing it to melt at lower temperatures than it would otherwise. A test temperature of 5 degrees is used in the Table 6 evaluation, as 5 degrees is below the effective melting temperature for sodium chloride. The application of the liquid calcium chloride solution is based on 5% of the weight of the salt.

| | |
|---|---|
| Sample #1 | 32% liquid solution of calcium chloride untreated |
| Sample #2 | 32% liquid solution of calcium chloride treated with .1% surface active agent. The surface active agent used was an ethoxylated nonylphenol 8 moles of ethylene oxide. Sample #2 contains .1% surface active agent based on the weight of the calcium chloride in the 32% solution. |
| Sample #3 | 32% liquid solution of calcium chloride treated with 2.1% surface active agent. The surface active agent used was an ethoxylated nonylphenol 8 moles of ethylene oxide. Sample #3 contains a larger percentage of surface active agent to allow not only for the surface tension of the calcium chloride, but also the surface tension of the sodium chloride. The final concentration of the surface active agent will approximate .1% for the combined calcium chloride and sodium chloride solution. |

The above samples were coated onto dry samples of sodium chloride at 5% of the weight of the sodium chloride. The resultant compositions were placed on ice for 20 minutes at 5 degrees and the melted volumes in milliliters compared per SHRP-H-205.3. Each sample application was replicated four times. Comparison of the melting values follow.

TABLE 6

| | Sample #1 | Sample #2 | Sample #3 |
|---|---|---|---|
| Test #1 | 1.6 | 1.9 | 2.0 |
| Test #2 | 1.5 | 1.7 | 1.9 |
| Test #3 | 1.8 | 2.0 | 1.8 |
| Test #4 | 1.6 | 1.7 | 1.9 |
| Average | 1.625 | 1.825 | 1.9 |
| Gain over #1 | | .2 | .275 |
| % Gain | | 12.3% | 16.9% |

A summary of the results of Table 6 would indicate the addition of a surface active agent to a prewet solution such as liquid calcium chloride in very small amounts will increase the melting performance of a melting salt such as sodium chloride. Also, while it should be noted an addition of a 5% prewet solution of liquid calcium chloride and/or magnesium chloride would certainly aid the melting performance of sodium chloride, it is only usable and practical when applying ice melting salts in a bulk spreader truck where the prewet solution is solution added just prior to the spreading application. But in processes where the ice melting salts are packaged and stored for future applications, the liquid prewet additions are impractical, as they would lead to caking in storage, rendering the ice melting agents unusable. The addition of a small amount of surface active agent coating will not cause any storage problems for packaged material, making it an ideal choice as a method of enhancing the melting volume and melting speed of ice melting salts.

Ice melting agents in their dry form are incapable of melting ice or snow. They must form a liquid brine. This brine lowers the freezing point of water and effectively dissolves (melts) ice and snow on contact until it becomes diluted to a concentration where its freezing point is raised near water. The natural surface tensions of the liquid ice melting brine slow the melting action. The key benefit of the surface active agent is the reduction of this natural surface tension. This reduction of surface tension allows the ice melting brine to penetrate the ice and snow quicker, increasing the ice melting speed and volume of melt. This action will continue until the salt has finally converted to a brine.

Table 7 follows the melting action of sodium chloride and calcium chloride to the end point where the surface active agent no longer makes a sizeable gain.

| | |
|---|---|
| Sample #1 | untreated sodium chloride |
| Sample #2 | sodium chloride treated with .1% surface active agent. The surface active agent is ethoxylated nonylphenol 8 moles of ethylene oxide. |
| Sample #3 | untreated calcium chloride dihydrate |
| Sample #4 | calcium chloride dihydrate treated with .1% surface active agent. The surface active agent is ethoxylated nonylphenol 8 moles of ethylene oxide. |

The above compositions were placed on ice per SHRP-H-205.3 standards at 15° F. for various time periods until the percentage gains became minimal. Each sample was replicated 4 times and averaged. These averages were compared as follows:

TABLE 7

| | Sample #1 (untreated) | Sample #2 (treated) | Gain | % Gain |
|---|---|---|---|---|
| 10 Min | 4.1 | 5.4 | 1.3 | 31.7 |
| 20 Min | 5.81 | 7.33 | 1.52 | 26.2 |
| 60 Min | 14.0 | 16.2 | 2.2 | 15.7 |
| 120 Min | 18.4 | 18.7 | .3 | 1.6 |
| | Sample #3 (untreated) | Sample #4 (treated) | Gain | % Gain |
| 10 Min | 9.1 | 11.0 | 1.9 | 20.1 |
| 20 Min | 10.24 | 11.8 | 1.56 | 15.2 |
| 60 Min | 14.2 | 15.0 | .8 | 5.6 |

The differences in time periods for sodium chloride and calcium chloride are easily explained. As Table 7 demonstrates, calcium chloride is hygroscopic in nature. This allows it to make a quicker transition into a brine solution, making it a much faster ice melter than sodium chloride.

In Table 7, the positive effect of a surface active agent on sodium chloride and calcium chloride is very apparent. The treated sample is a superior ice melter up to two hours on sodium chloride and up to one hour on calcium chloride. When the % gains narrow, the ice melting salt is thoroughly dissolved.

In conclusion, the key to a superior ice melting agent is speed. The sooner a slip hazard can be eliminated, the safer the surface. Ice melting salts treated with surface active agents will convert to a liquid melting brine quicker, allowing those ice melting salts to melt more volume faster than untreated samples. From the many examples here presented, it can be seen that the invention at least accomplishes all of its stated objectives.

What is claimed is:

1. A quick melting ice melter composition comprising:
   an effective amount of an ice melter; and
   a small but melt speed enhancing effective amount of an ice melter compatible surface agent;
   whereby the ice melter compatible surface active agent is coated upon the ice melter.

2. The ice melter composition of claim 1 wherein the ice melter compatible surface active agent is selected from the group consisting of anionic, nonionic, cationic and amphoteric surface active agents.

3. The ice melter composition of claim 2 wherein the surface active properties of the ice melter compatible surfactant are maintained in the presence of high electrolyte concentrations and at cold temperatures from 32° F. down to −25° F.

4. The ice melter composition of claim 3 wherein the amount of surfactant is from 0.001% by weight of the total composition to 2% by weight of the total composition.

5. The ice melter composition of claim 4 wherein the amount of surfactant is from 0.01% by weight of the composition to 1.0% by weight of the composition.

6. The ice melter composition of claim 2 wherein the ice melter compatible surface active agent is an anionic surfactant or a nonionic surfactant.

7. In ice melter compositions, the improvement comprising:
   adding to the ice melter composition comprising an ice melter a small but melt speed enhancing effective amount of an ice melter compatible surface active agent, and
   coating the ice melter with the ice melter compatible surface active agent.

8. The ice melter composition of claim 1 wherein the ice melter is one or more compounds selected from the group consisting of sodium chloride, potassium chloride, magnesium chloride, calcium chloride, and urea.

* * * * *